United States Patent [19]

Sauber et al.

[11] 4,123,366

[45] Oct. 31, 1978

[54] DRILLING MUD CONTAINING SODIUM CARBOXYMETHYLCELLULOSE AND SODIUM CARBOXYMETHYL STARCH

[75] Inventors: Charles A. Sauber; Louis E. Roper, both of Bartlesville, Okla.

[73] Assignee: Phillips Petroleum Company, Bartlesville, Okla.

[21] Appl. No.: 821,369

[22] Filed: Aug. 3, 1977

[51] Int. Cl.$^2$ ............................................. C09K 7/02
[52] U.S. Cl. ............................. 252/8.5 A; 252/8.5 C
[58] Field of Search ......................... 252/8.5 A, 8.5 C

[56] References Cited

U.S. PATENT DOCUMENTS

| | | | |
|---|---|---|---|
| 2,425,768 | 8/1947 | Wagner | 252/8.5 |
| 2,561,418 | 7/1951 | Ryan | 252/8.5 |
| 2,957,822 | 10/1960 | Frint | 252/8.5 |
| 3,105,046 | 9/1963 | Fischer | 252/8.5 |
| 3,471,402 | 10/1969 | Shannon et al. | 252/8.5 |

OTHER PUBLICATIONS

Rogers, Composition and Properties of Oil Well Drilling Fluids, Third Edition, 1963, pp. 471, 475, 477 and 478.

Kerr, Chemistry and Industry of Starch, 1944, p. 191.

*Primary Examiner*—Herbert B. Guynn

[57] ABSTRACT

Sodium carboxymethylcellulose and sodium carboxymethyl starch incorporated together in drilling mud, especially sea water mud, yield better flow properties with low fluid loss in drilling mud. The control of flow properties and thixotropy at low water loss values in salty drilling muds are better when the mixture is used than for either of the materials used separately.

2 Claims, No Drawings

DRILLING MUD CONTAINING SODIUM CARBOXYMETHYLCELLULOSE AND SODIUM CARBOXYMETHYL STARCH

This invention relates to drilling mud. In one of its aspects, the invention relates to a drilling mud additive. In a further aspect of the invention, it relates to a method of drilling a well, e.g., an oil well or gas well.

In one of its concepts, the invention provides a drilling mud containing sodium carboxymethylcellulose (CMC) and sodium carboxymethyl starch (CMS), each being present in an amount sufficient to improve flow properties. In another of its concepts the invention provides a drilling mud made with salt water, e.g., sea water. In a further concept of the invention it provides a process for drilling a well, e.g., an oil or gas well or the like employing a drilling mud which can be made up at least in part with salt water, e.g., sea water, the mud having therein as additive a mixture of CMC and CMS.

Polymers such as CMC (sodium carboxymethylcellulose) or CMS (sodium carboxymethyl starch) are usually added to salt muds to reduce the water loss. In so doing, they also change the flow properties [Plastic Viscosity (PV) and Yield Point (YP)] as well as the thixotropy [gel strength (gels)]. Precise control of flow properties is important because of their effect on drilling rate, hole cleaning, gas entrainment, lost circulation, and so forth. Precise control of thixotropy is needed to insure suspension of drilled solids and weighting agents when circulation ceases. The desired properties vary greatly depending on a number of hole conditions such as size, depth, temperature, pressure, and so forth.

An object of the invention is to provide a drilling mud. Another object of the invention is to provide a drilling mud additive. Another object of the invention is to provide a drilling mud having improved flow properties with low fluid loss. Still another object of the invention is to provide a method for drilling a well employing a drilling mud.

Other aspects, concepts, objects and the several advantages of the invention are apparent from a study of this disclosure and the claims.

According to the invention, an improved drilling mud which can be made with salt water, e.g., sea water is prepared by introducing into the mud both CMC and CMS.

Thus, we have discovered that a mixture of sodium carboxymethylcellulose and sodium carboxymethyl starch gives better control of flow properties and thixotropy at low water loss values in salty drilling mud than either sodium carboxymethylcellulose or sodium carboxymethyl starch used separately.

U.S. Pat. No. 2,425,768, Aug. 19, 1947, Wagner, teaches use of carboxymethylcellulose in drilling mud containing salt up to 238,000 parts per million. Example A in Col. 4 in Wagner lists characteristics of a typical drilling mud containing 4,800 parts per million of salt. Salt was added to this mud to make 238,000 parts per million of salt. The mud was thereby made completely unsuitable for use. According to the invention, subsequent addition of sodium carboxymethylcellulose restored the mud to be again suitable for use in well drilling.

U.S. Pat. No. 2,561,418, July 24, 1951, Ryan, teaches use of sodium carboxymethyl starch in salty drilling muds.

The disclosures of these patents are incorporated by reference.

Data in Table I, Part A show that in a laboratory sea water mud, at water loss values of five or less, combinations of CMC (sodium carboxymethylcellulose) and CMS (sodium carboxymethyl starch) provide more flexible control of flow properties and thixotropy over muds containing only CMC or CMS. Note especially how well the PV, YP and gels can be precisely controlled with combinations of CMS and CMC. For example, gels can have a wide range of values when the combination of CMS and CMC is used and, at the same time, moderate to low PV and YP values are obtained. In this sea water mud (Initial Properties), the PV of the mud treated with CMC is quite high (32 cp) which increases horsepower needed to pump the mud down the drill pipe. With CMS, the PV is improved (15 cp) but the YP (32 lb/100 sq. ft.) and the initial gel (24 lb/100 sq. ft.) are quite high. High YP requires more horsepower to pump the mud up the well annulus, and high initial gel causes severe gas entrapment. Results after aging at 80 C are similar.

Data in Table I, Part B relate to saturated salt water mud. At equal water loss, the CMS:CMC blends gave higher viscosities and gel strengths than either CMS or CMC alone. This was unexpected as both CMS and CMC alone give very low viscosities and gel strengths in this saturated salt water mud. The combination of CMS and CMC allows improved control of both YP and gels. Hole cleaning is affected by YP; usually YP values greater than 1.0 lb/100 sq. ft. are desirable.

TABLE I

| Conc, lb/bbl | Ratio CMS:CMC | Initial Properties | | | | Aged Overnight at 80 C (175 F) | | | |
|---|---|---|---|---|---|---|---|---|---|
| | | PV | YP | Gels | WL | PV | YP | Gels | WL |
| Part A: KB5 Sea Water Mud | | | | | | | | | |
| Base Mud CMC - MV Driscose® | | 4 | 9 | 7/10 | 70.0 | 4 | 10 | 8/10 | 68 |
| 4.0 CMS | — | 32 | 15 | 2/11 | 3.6 | 29 | 9 | 0/4 | 3.9 |
| 5.0 | — | 15 | 32 | 24/47 | 5.0 | 13 | 27 | 14/40 | 3.9 |
| Combinations of CMS and CMC | | | | | | | | | |
| 5.0 | 3:2 | 16 | 4 | 0/6 | 3.2 | 15 | 3 | 0/6 | 3.1 |
| 5.0 | 4:1 | 12 | 6 | 1/12 | 3.7 | 11 | 6 | 0/11 | 3.8 |
| 5.0 | 9:1 | 13 | 12 | 4/22 | 4.2 | 12 | 10 | 3/14 | 3.9 |
| 5.0 | 19:1 | 14 | 16 | 9/32 | 4.7 | 12 | 14 | 4/16 | 3.8 |
| Part B: KB5 Saturated Salt Water Mud | | | | | | | | | |
| Base Mud CMC - MV Driscose® | | 8 | 19 | 12/15 | 97 | 7 | 22 | 14/15 | 96 |
| 2.0 CMS | — | 10 | 1 | 0/2 | 11.0 | 8 | 0 | 0/0 | 18.6 |
| 5.0 | — | 13 | 2 | 0/0 | 6.2 | 10 | 1 | 0/1 | 6.2 |
| Combinations of CMS and CMC | | | | | | | | | |

TABLE I-continued
PERFORMANCE OF VARIOUS RATIOS OF CMS AND CMC

| | | | | | | | | | |
|---|---|---|---|---|---|---|---|---|---|
| 5.0 | 3:2 | 18 | 4 | 0/5 | 3.7 | 14 | 2 | 0/2 | 3.8 |
| 5.0 | 4:1 | 12 | 5 | 1/16 | 6.6 | 12 | 2 | 1/9 | 11.1 |
| 5.0 | 9:1 | 12 | 8 | 2/18 | 7.6 | 11 | 4 | 0/6 | 9.1 |
| 5.0 | 19:1 | 15 | 9 | 1/16 | 7.0 | 11 | 4 | 0/3 | 7.7 |

Tests were made in accordance with API RP 13B "Standard Procedure for Testing Drilling Fluids" and abbreviations are taken from that standard.

Sea water, such as the water used for making KB5 laboratory sea water mud, typically contains about 32,000 ppm of salt. Saturated salt water, such as that used for making KB5 saturated salt water mud, contains about 306,000 ppm of salt. Both muds contain 20 percent by weight kaolin and 4 percent by weight bentonite (5 to 1 ratio, hence "KB5") in synthetic sea water or saturated NaCl water.

Thus, these data teach that CMS:CMC blends are useful in salty drilling muds, particularly sea water muds.

In addition, the invention provides the advantage that whenever sodium carboxymethylcellulose is unusually high in price or in short supply, the substitution can be made of sodium carboxymethyl starch for a substantial portion of the CMC, which is often used by itself.

Reasonable variation and modification are possible in the scope of the foregoing disclosure and the appended claims to the invention the essence of which is that substitution of sodium carboxymethyl starch for at least a portion of sodium carboxymethylcellulose yields highly desirable drilling muds especially in salty water each apparently retaining its desirable characteristics while each, at least to an extent, has yielded undesirable characteristics, as demonstrated herein by the data.

We claim:

1. A clay-based drilling mud composed with seawater containing as additive therein to provide a low fluid loss and improved flow properties sodium carboxymethyl starch and sodium carboxymethylcellulose wherein said additives are respectively present in a weight ratio of from about 3:2 to about 19:1.

2. A process of drilling a well employing a clay-based drilling mud composed with seawater which comprises adding to the drilling mud to provide low fluid loss and improved flow properties sodium carboxymethyl starch and sodium carboxymethylcellulose, respectively, in the range of from about 3:2 to about 19:1 and circulating said drilling mud in said well.

* * * * *